United States Patent [19]

Shah

[11] 3,838,293

[45] Sept. 24, 1974

[54] THREE CLOCK PHASE, FOUR TRANSISTOR PER STAGE SHIFT REGISTER

[75] Inventor: Rajendra B. Shah, Escondido, Calif.

[73] Assignee: The National Cash Register Company, Dayton, Ohio

[22] Filed: Oct. 11, 1973

[21] Appl. No.: 405,676

[52] U.S. Cl. ...... 307/221 D, 307/221 C, 307/224 C, 307/246, 307/304

[51] Int. Cl. ...................... H03k 23/24, H03k 25/02

[58] Field of Search.... 307/205, 214, 221 R, 221 C, 307/221 D, 224 R, 224 C, 246, 269, 304

[56] References Cited

UNITED STATES PATENTS

| | | | |
|---|---|---|---|
| 3,524,077 | 8/1970 | Kaufman | 307/251 X |
| 3,610,951 | 10/1971 | Howland | 307/205 X |
| 3,638,036 | 1/1972 | Zimbelmann | 307/221 D X |
| 3,683,203 | 8/1972 | Smith | 307/304 X |
| 3,789,239 | 1/1974 | Heeren | 307/221 C |

OTHER PUBLICATIONS

Goth, "FET Shift Register," IBM Tech. Discl. Bull., Vol. 13, No. pgs. 310–311, 7/1970.

*Primary Examiner*—Stanley D. Miller, Jr.
*Assistant Examiner*—L. N. Anagnos
*Attorney, Agent, or Firm*—J. T. Cavender; James H. Phillips

[57] ABSTRACT

In order to achieve increased packing density, a simplified ratioless shift register stage is provided which utilizes only four transistors per stage and requires only three clock signals. A stage input signal is clocked through a transistor dynamic inverter with a $\phi_1$ clock signal. The information is then coupled through a single transistor inverter with a $\phi_2$ clock signal which is present concurrently with and also extends beyond $\phi_1$. After the termination of $\phi_2$ the information is coupled to a stage output point through a single transistor switch actuated by a $\phi_3$ clock signal.

3 Claims, 2 Drawing Figures

THREE CLOCK PHASE, FOUR TRANSISTOR PER STAGE SHIFT REGISTER

Figure 1:
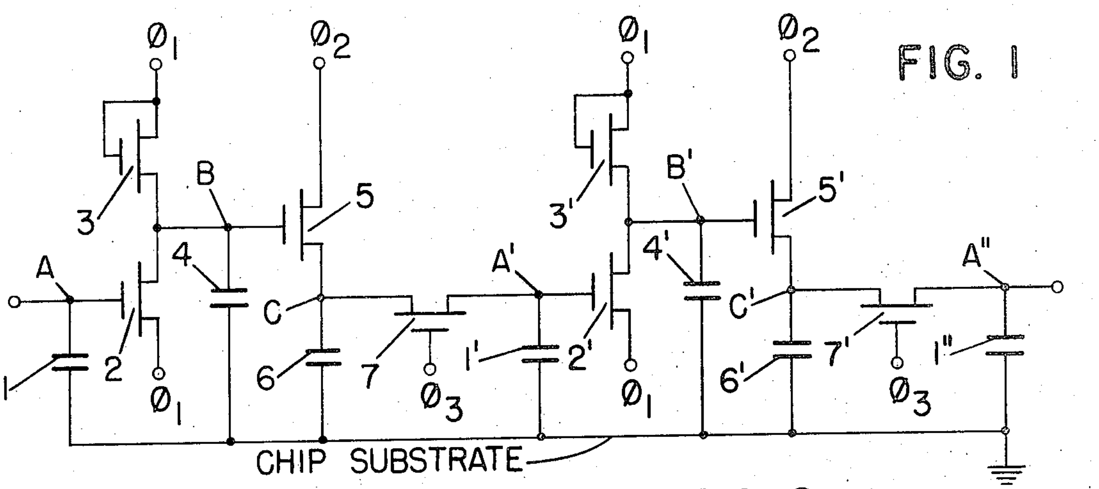

This invention relates to registers and, more particularly, to integrated circuit shift registers.

In order to achieve medium and large scale integration, it is a fundamental requirement that individual digital devices, such as gates, flip-flops semiconductor storage cells, etc., must be largely fabricated from combinations of active devices. That is, discrete resistors, capacitors and inductors are almost completely eliminated although the inherent capacitance observed between device leads and a chip substrate is used to advantage to furnish the means for achieving temporary binary storage at various electrical points within a circuit.

The necessity for fabricating circuit arrays from networks of active devices carries a constraint against the establishment of low impedance paths between the circuit power supply and ground in order that power consumption and heat dissipation remain manageable. Thus, clocking techniques have been developed to methodically pass stored charges from electrical point to electrical point within a logic element under the influence of clock signals having various phase relationships to one another.

One well known system utilizes four phase clocking. In this ratioless system, individual shift register stages require six active devices to realize the electrical point isolation essential to low power operation. However, those skilled in the art will understand that the additional circuitry necessary to provide the four diverse clock signals and the six active devices for each register stage limit the circuit density which can be achieved.

A somewhat simpler system employing six active devices per register stage utilizes two phase clocking. However, d-c paths are established between the system power supply and logic ground in these ratio type devices such that heat dissipation, while not the prominent problem observed in static registers, is nonetheless a limiting factor to circuit density. Power consumption is also higher than with the four phase circuits, and the two phase system is not as fast due to the larger lead to ground capacitance which follows less dense packing. Further, these ratio type devices inherently require larger than minimum size load transistors which is a very serious limitation on the density that can be achieved.

Another system utilizes an eight active device per register stage configuration in conjunction with a two phase clock to eliminate d-c paths between a power supply and ground. While this system provides a useful compromise between clock circuit complexity and power dissipation, circuit density is unduly limited by the high number of active devices per register stage.

Thus, it will be readily apparent that it would be highly desireable to achieve a fully clocked register which includes fewer than six active devices per stage. A further benefit would be realized if such a register requires fewer than four clock phases whereby support circuitry could be simplified.

It is therefore a broad object of my invention to provide an improved integrated circuit shift register.

It is another object of my invention to provide a fully clocked shift register comprising only four active devices per stage.

In another aspect, it is an object of my invention to provide a fully clocked, ratioless shift register requiring only three clock phases to eliminate d-c paths between a power source and ground.

Briefly, these and other objects of the invention are achieved by clocking a stage input signal through a two active device dynamic inverter with a $\phi_1$ clock signal, coupling the information through a single active device inverter with a $\phi_2$ clock signal which is present concurrently with and also extends beyond $\phi_1$, and subsequently, after the termination of $\phi_2$, coupling the information to a stage output point through a single active device switch actuated by a $\phi_3$ clock signal.

Figure 2:
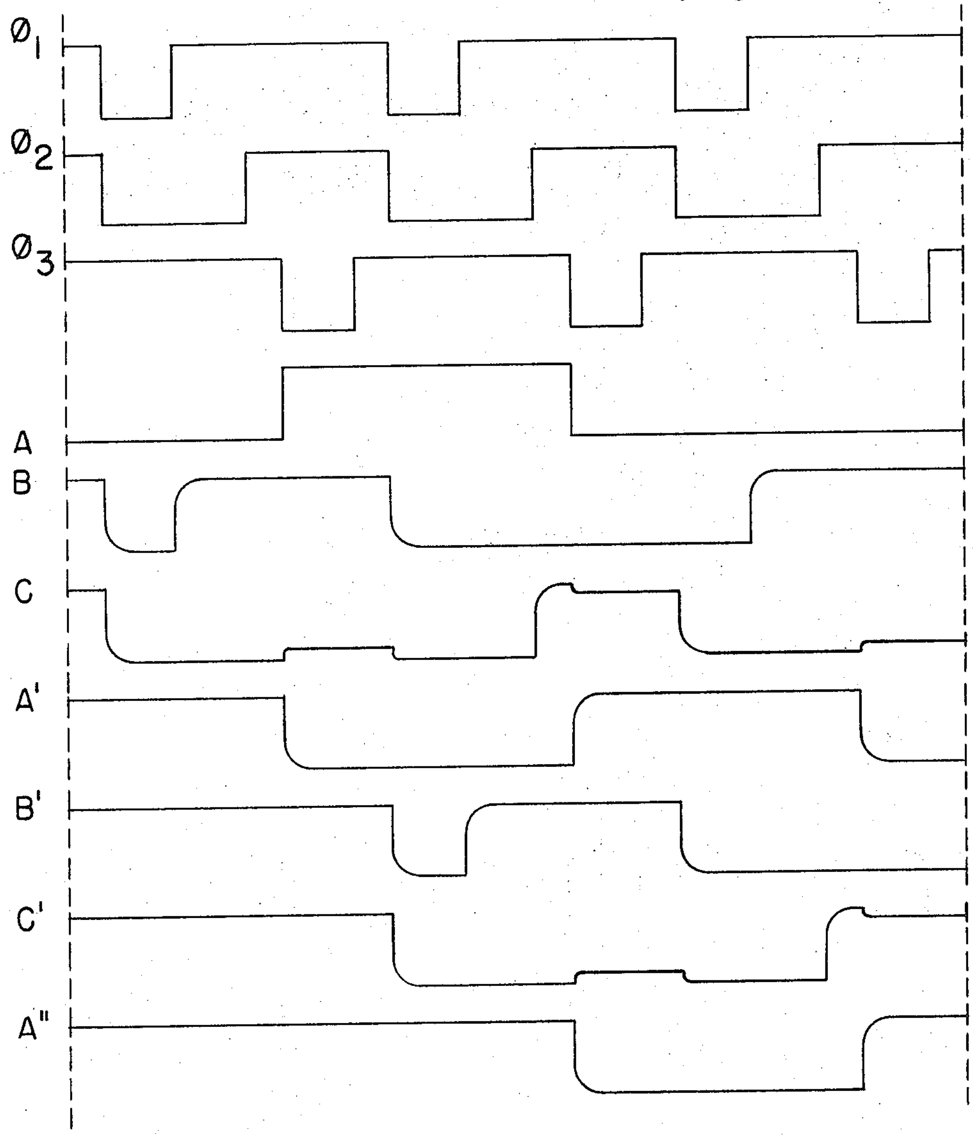

The principles of the invention and the circuit configuration and operation of an exemplary embodiment thereof will become clear to those skilled in the art through a study of the following specification taken in conjunction with the subjoined claims and the drawing of which:

FIG. 1 is a schematic diagram illustration two adjacent stages of a shift register having any number of identical stages; and FIG. 2 is a timing diagram illustrating the time relationships between the three clock signals and voltage levels at various electrical points as an exemplary bit pattern is pumped through the two register stages of FIG. 1.

Referring now to FIG. 1, it will be observed that the exemplary circuitry may be fabricated utilizing P-channel enhancements MOS techniques such that a logic "1" is represented by a negative voltage. Those skilled in the art will understand the methodical alterations necessary to practice the invention utilizing other fabrication processes.

An input signal to the first register stage is temporarily stored at node A across the capacitor 1 which, it wlll be understood, is the capacitance between the lead comprising one capacitor plate and the chip substrate comprising the other (ground) capacitor plate. All capacitors shown in FIG. 1 are so constituted. A dynamic inverter, including series connected MOS field effect transistor switch 2 and isolation MOS field effect transistor 3, is controlled by clock signal $\phi_1$ applied across the series pair. The logic voltage observed at node B, the electrical point between transistors 2 and 3, is temporarily stored by capacitor 4. This level is coupled to the gate electrode of MOS field effect transistor 5 which is connected between clock signal $\phi_2$ and capacitor 6. An output MOS field effect transistor switch 7 serves to distribute any change stored on capacitor 6, node C, to capacitor 1', node A', under the influence of clock signal $\phi_3$ which actuates transistor 7.

Capacitor 1' may be deemed the input storage device for the second register stage depicted in FIG. 1. Elements identified by primed numbers in FIG. 1 are second stage equivalents of the correspondingly numbered first stage elements. Similarly, capacitor 1'' may be deemed the input storage device for a successive register stage or other logic means.

Operation of the circuit will best be understood by simultaneous reference to FIGS. 1 and 2 as the description proceeds. Attention is directed to the general time relationship between the clock signals $\phi_1$, $\phi_2$, and $\phi_3$. The leading edges (negative going in the example) of $\phi_1$ and $\phi_2$ occur simultaneously; however, $\phi_1$ terminates before $\phi_2$. $\phi_3$, on the other hand, overlaps neither $\phi_1$ nor $\phi_2$, its leading edge appearing after the termination of $\phi_2$ and its trailing edge occurring before the next successive leading edges of $\phi_1$ and $\phi_2$. Inasmuch as means for generating and distributing $\phi_1$, $\phi_2$, and $\phi_3$ constitute no part of the present invention, conventional techniques being satisfactory, such generating means is omitted from FIG. 1 for the sake of clarity.

For convenience, the two register stages shown in FIG. 1 may be considered as initially in a completely cleared state with nodes B, C, A', B', C', and A'' all at ground potential (logic "0"). As represented by waveform A of FIG. 2, a bit string in the pattern 1011 is applied to the input of the first register stage.

When $\phi_1$ occurs, capacitor 4 charges in the negative direction through both transistors 2 and 3 such that node B rapidly temporarily assumes a logic "1" level as represented by waveform B. However, when $\phi_1$ is no longer true and switches to ground potential (logic "0"), capacitor 4 rapidly discharges through transistor 2 which is held in the conducting stage by the input signal at node A.

During the whole of $\phi_1$, $\phi_2$ is also true. Since node B is a logic "1" during $\phi_1$, the transistor 5 is in the conducting state thereby permitting the capacitor 6, node C, to charge to a logic "1". After $\phi_1$ terminates and node B switches back to a logic "0," the transistor 5 is cut off, and the logic "1" is temporarily stored by the capacitor 6 as represented by waveform C.

Subsequently, the occurrence of clock signal $\phi_3$ renders switch transistor 7 conductive to dispose capacitors 6 and 1' in parallel to distribute the charge between nodes C and A'. The capacitance of capacitor 6 is preferably several times that of capacitor 1' in order that the logic "1" coupled to the second register stage is safely in excess of the threshold of transistor 2'.

Well before the next occurrence of $\phi_1$, the input signal to the first register stage (waveform A) has shifted to a logic "0" as the next information bit of the exemplary bit train. During $\phi_1$, capacitor 4 therefore changes to a logic "1" through transistor 3. However, after $\phi_1$ terminates, capacitor 4 cannot discharge through the transistor 2 which is held off by the signal at node A. Thus, as shown in waveform B, capacitor 4 temporarily stores a logic 1 to hold transistor 5 conductive. As a result, at the termination of $\phi_2$, capacitor 6 discharges through transistor 5 to a logic "0" as represented by waveform C.

Subsequently, during $\phi_3$, the logic "0" stored by capacitor 6 is propagated through transistor 7 to capacitor 1' (waveform A').

Simultaneously, during the second cycle of operation, the logic "1" previously stored by capacitor 1' is processed through the second register stage (waveforms A', B', and C') to capacitor 1'' (waveform A'').

During a third cycle of operation in which the input signal to the first register stage (waveform A) is again a logic "1," the "1" input is propagated to capacitor 1', and the "0" previously stored by capacitor 1' is shifted to capacitor 1''.

Those skilled in the art will appreciate that conventional assumptions have been made in the above description of the exemplary embodiment's operation. Specifically, the various capacitors, although quite small, do not charge instantaneously such that a finite delay occurs, for example, before node B reaches the threshold of transistor 5 to permit capacitor 6 to commence charging, these delays are uniform from stage to stage and easily accommodated by sufficiently wide $\phi_1$, $\phi_2$, and $\phi_3$ clock pulses.

While the principles of the invention have now been made clear in an illustrative embodiment, there will be immediately obvious to those skilled in the art many modifications of structure, arrangements, proportions, the elements, materials, and components used in the practice of the invention which are particularly adapted for specific environments and operating requirements without departing from those principles.

I claim:

1. In a logic system including means for developing first, second, and third clock signals, the first and second clock signals being true concurrently, the second clock signal being true after the first clock signal becomes false, and the third clock signal being true only when the first and second clock signals are false, an integrated circuit shift register consisting of a plurality of serially coupled, identical stages, each said stage comprising:

A. a first transistor switch;

B. a second transistor switch;

C. said first and second transistor switches connected in series, each of said first and second transistor switches having a first electrode connected to receive the first clock signal, second electrodes of said first and second transistor switches being connected together, a control electrode of said first transistor switch being coupled to receive a logical input signal, a control electrode of said second transistor switch being connected to receive and respond to the first clock signal;

D. a third transistor switch;

E. a fourth transistor switch;

F. a first electrode of said third transistor switch being connected to receive the second clock signal, a second electrode of said third transistor switch being connected to a first electrode of said fourth transistor switch, a second electrode of said fourth transistor switch effecting a stage output terminal;

G. a control electrode of said third transistor switch being connected to said second electrodes of said first and second transistors, a control electrode of said fourth transistor switch being connected to receive and respond to the third clock signal; and H. first, second, and third capacitive temporary storage means connected, respectively, between said control electrode of said first transistor switch and ground, between said control electrode of said third transistor switch and ground, and between said first electrode of said fourth transistor switch and ground.

2. The integrated circuit shift register stage of claim 1 in which said first, second, and third capacitive temporary storage means each comprise the inherent capacitance between a conductive lead in the circuit and the integrated circuit substrate.

3. The integrated circuit shift register of claim 2 in which each of said first, second, third, and fourth transistor switches comprises an MOS field effect transistor.

* * * * *